US011135822B2

(12) United States Patent
Kim et al.

(10) Patent No.: US 11,135,822 B2
(45) Date of Patent: Oct. 5, 2021

(54) POLYESTER FILM FOR WINDOW

(71) Applicant: TORAY ADVANCED MATERIALS KOREA INC., Gyeongsangbuk-do (KR)

(72) Inventors: Young Ho Kim, Gyeongsangbuk-do (KR); Chang Hee Kim, Gyeongsangbuk-do (KR); Gyu Seok Lee, Gyeongsangbuk-do (KR); Sung Heui Hong, Gyeongsangbuk-do (KR)

(73) Assignee: TORAY ADVANCED MATERIALS KOREA INC., Gyeongsangbuk-Do (KR)

( * ) Notice: Subject to any disclaimer, the term of this patent is extended or adjusted under 35 U.S.C. 154(b) by 0 days.

(21) Appl. No.: 16/964,642

(22) PCT Filed: Jan. 24, 2019

(86) PCT No.: PCT/KR2019/001009
§ 371 (c)(1),
(2) Date: Jul. 24, 2020

(87) PCT Pub. No.: WO2019/147037
PCT Pub. Date: Aug. 1, 2019

(65) Prior Publication Data
US 2021/0053332 A1    Feb. 25, 2021

(30) Foreign Application Priority Data

Jan. 24, 2018  (KR) .................. 10-2018-0008586
Jan. 24, 2019  (KR) .................. 10-2019-0009056

(51) Int. Cl.
*B32B 27/30*     (2006.01)
*B32B 27/36*     (2006.01)
*B32B 38/00*     (2006.01)

(52) U.S. Cl.
CPC ...... *B32B 27/36* (2013.01); *B32B 2038/0028* (2013.01); *B32B 2255/10* (2013.01); *B32B 2309/105* (2013.01); *B32B 2367/00* (2013.01)

(58) Field of Classification Search
CPC .............. B32B 27/36; B32B 2309/105; B32B 2255/10

(Continued)

(56) References Cited

U.S. PATENT DOCUMENTS

2021/0053332 A1*  2/2021  Kim .................. B32B 27/08

FOREIGN PATENT DOCUMENTS

JP    H08-323944 A    12/1996
JP    2008-069204 A    3/2008

(Continued)

OTHER PUBLICATIONS

International Search Report from corresponding PCT Application No. PCT/KR2019/001009, dated May 10, 2019, with English translation.

*Primary Examiner* — Betelhem Shewareged
(74) *Attorney, Agent, or Firm* — Harness, Dickey & Pierce, P.L.C.

(57) ABSTRACT

The present invention relates to a polyester film for windows, which can block harmful ultraviolet rays from outside or prevent glare from direct sunlight and reduce thermal energy when attached to an exterior wall glass of a building or a vehicle, which can also resolve the phenomenon that an image is blurred or unclear and the image is broken when looking at an external shape through the glass, and in which a clear external shape can be confirmed even through a polyester film because fine roll-drag defects in the longitudinal that could be caused in the manufacturing process of the polyester film are not visible, and the film can be easily shrunk and peeled off even at high temperatures when (Continued)

applying a window film to the glass of a vehicle or a building with the polyester film being laminated with a release film.

13 Claims, 1 Drawing Sheet

(58) Field of Classification Search
USPC .................................................... 428/411.1
See application file for complete search history.

(56) References Cited

FOREIGN PATENT DOCUMENTS

| | | |
|---|---|---|
| JP | 2013-234271 A | 11/2013 |
| KR | 10-1999-0070960 A | 9/1999 |
| KR | 10-2002-0073305 A | 9/2002 |
| KR | 10-2004-0072862 A | 8/2004 |

* cited by examiner

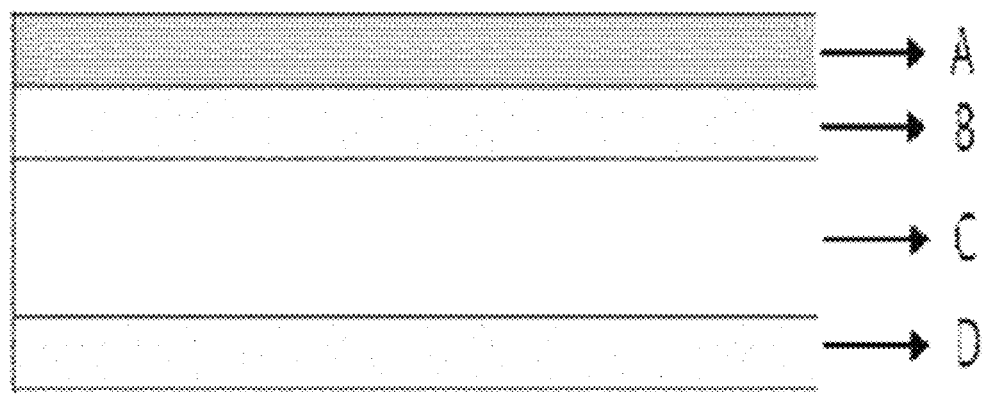

POLYESTER FILM FOR WINDOW

CROSS-REFERENCE TO RELATED APPLICATIONS

This application is a national phase application of PCT Application No. PCT/KR2019/001009, filed on Jan. 24, 2019, which claims the benefit and priority to Korean Patent Application No. 10-2018-0008586, filed on Jan. 24, 2018 and Korean Patent Application No. 10-2019-0009056, filed on Jan. 24, 2019. The entire disclosures of the applications identified in this paragraph are incorporated herein by references.

FIELD

The present invention relates to a polyester film for windows, and more particularly, to a polyester film for windows that can improve image blurring, has excellent optical surface visibility, and is convenient to work with during application.

BACKGROUND

A polyester film for windows, generally called a tinting film, is broadly classified into automotive and architectural applications depending on its use, and is classified into reflective and non-reflective types depending on whether or not a deposition film is employed.

Such a film for windows is used as a substrate of a product for high-transparency hard coating to add color to a high-transparency polyester film and to protect the surface of the product, thereby enabling to block harmful ultraviolet rays or to prevent glare from direct sunlight and reduce thermal energy.

On the other hand, the market for automotive window films has grown along with customers who have been seeking products that are less expensive and of high quality, under the fierce competition of price and quality in the same trend as the growth of the automobile market.

Hence, nowadays, already beyond the offline processing market for secondary processing, various in-line coated polyester films, which have improved surface adhesion through a functional primer coating treatment on the surface simultaneously with polyester film production, are mass-produced and sold, and large window processing companies that have grown along with the automotive market are actively engaged in activities such as joint development through collaboration and cooperation with large companies that produce polyester films.

By reflecting these market trends as they are, there is a need to make window films that are optically excellent and easy to work with, thereby providing them to customers.

However, since there exist issues of image blurring, workability, and so on that have been persistently problematic, in particular, in the window polyester film market, there is an urgent need to provide a uniform polyester film for windows by resolving these problems.

SUMMARY

Technical Objects

The present invention is devised to meet the needs described above and to solve the conventional problems, and it is an object of the present invention to provide a polyester film for windows that can suppress the graininess visibility of particles that is internally optically recognized, secure basic strength and elongation, suppress roll-drag marks in the longitudinal direction that are recognized with the naked eye, and be easily shrunk and peeled off even at high temperatures when applying films to the glass of a vehicle and a building.

The above and other objects and advantages of the present invention will become more apparent from the following description of the preferred embodiments.

Technical Solution

The above object is achieved by a polyester film for windows comprising: a three-layer laminated polyester film produced by a sequential biaxial stretching method; and a coating layer A containing an aqueous emulsion of an acrylic acid alkyl ester copolymer on at least one face of the three-layer laminated polyester film, wherein the three-layer laminated polyester film consists of a polyester resin layer C that does not contain fine particles, and particle layers B and D of a polyester resin containing an amorphous calcium carbonate compound as upper and lower layers of the polyester resin layer C, wherein a thickness ratio of the layer C to the layers B and D is 4 to 40, and the three-layer laminated polyester film has a stretch ratio satisfying the following equation (1):

$$1.1 \leq Y/X \leq 1.5 \qquad \text{(equation 1)}$$

where X is a longitudinal stretch ratio, and Y is a transverse stretch ratio.

Here, the thickness ratio of the layer C to the layers B and D is 10 to 20.

Advantageously, wherein the stretch ratio of the three-layer laminated polyester film is 1.1 to 1.3.

Advantageously, the amorphous calcium carbonate compound has an average particle size of 0.01 to 1.5 µm.

Advantageously, the average particle size of the amorphous calcium carbonate compound is 0.8 to 1.2 µm.

Advantageously, the coating layer has a thickness of 5 to 20 nm.

Advantageously, the polyester film for windows has a thickness of 12 to 36 µm.

Advantageously, the polyester film for windows has a transverse heat shrinkage of 0 or lower out of the values of heat shrinkage measured by leaving the polyester film for windows in a constant temperature bath at 150° C. for 30 minutes.

Effects of the Invention

The prevent invention has an effect of enabling to block harmful ultraviolet rays from outside or to prevent glare from direct sunlight and reduce thermal energy, when attached to an exterior wall glass of a building or vehicle.

In addition, the present invention can resolve the phenomenon that an image is blurred or unclear and the image is broken when looking at an external shape through the glass.

Furthermore, the present invention has an effect that a clear external shape can be confirmed even through a polyester film because fine roll-drag defects in the longitudinal that could be caused in the manufacturing process of the polyester film are not visible, and an effect of being easily shrunk and peeled off even at high temperatures when applying a window film to the glass of a vehicle or building with the polyester film being laminated with a release film.

However, the effects of the present invention are not limited to those mentioned above, and further effects that have not mentioned above will be clearly understood by those having ordinary skill in the art from the following description.

BRIEF DESCRIPTION OF THE DRAWINGS

FIG. 1 is a cross-sectional view of a polyester film for windows in accordance with a preferred embodiment of the present invention.

DETAILED DESCRIPTION

Hereinafter, the present invention will be described in detail with reference to the embodiments and drawings of the present invention. It will be apparent to those having ordinary skill in the art that these embodiments are merely presented by way of example to describe the present invention in greater detail, and the scope of the present invention is not limited by such embodiments.

Unless defined otherwise, all technical and scientific terms used herein have the same meaning as commonly understood by those having ordinary skill in the art to which the present invention pertains. In case of conflict, the present specification that includes definitions of terms shall prevail. In addition, although other methods and materials similar or equivalent to those described herein may be used in implementation or testing of the present invention, suitable methods and materials are described herein.

In describing and/or claiming the present invention, the term "copolymer" is used to refer to a polymer formed by copolymerization of two or more monomers. Such copolymers include copolymers, terpolymers, or higher order copolymers.

FIG. 1 is a cross-sectional view of a polyester film for windows in accordance with a preferred embodiment of the present invention, and the polyester film for windows in accordance with the present invention comprises a three-layer laminated polyester film produced by a sequential biaxial stretching method, consisting of a polyester resin layer C that does not contain fine particles and particle layers B and D of a polyester resin containing an amorphous calcium carbonate compound as upper and lower layers of the polyester resin layer C, and comprises a coating layer A containing an aqueous emulsion of an acrylic acid alkyl ester copolymer on at least one face of the three-layer laminated polyester film.

Here, according to the present invention, the thickness ratio of the layer C to the layers B and D is preferably 4 to 40. This is because if the thickness ratio is controlled to be less than 4, the haze becomes higher, which in turn lowers the commercial usability as a window film, and if controlled to be over 40, it is difficult to ensure winding stability.

More preferably, the thickness ratio of 5 to 30 exhibits stability; however, since stability may be lower in the mass-production stage, most preferably, a thickness ratio of 10 to 20 makes it possible to secure mass-production stability and winding stability.

In addition, the three-layer laminated polyester film in accordance with the present invention preferably has a relative ratio of the transverse stretch ratio to the longitudinal stretch ratio of 1.1 to 1.5.

As with the refractive index, the stretch ratio is related to the optical properties of the polyester film, and since the longitudinal stretch is mainly made by a running process between rolls and the transverse stretch is controlled by an air float type within an oven without rolls, the higher the longitudinal stretch ratio, the higher the friction and peeling heat between the rolls and the polyester film, which in turn leaves fine drag marks of rolls in the longitudinal direction inside the polyester film; when attached to the glass of a building and a vehicle, these marks are visually recognized as they are, which may cause customer complaints; hence, the lower the longitudinal stretch ratio and the higher the transverse stretch ratio, the less the roll-drag marks are visually recognized with to the naked eye; therefore, it is possible to control the longitudinal heat shrinkage to be higher and the transverse heat shrinkage to be lower at high temperatures.

If the relative stretch ratio is controlled to be less than 1.1, the longitudinal stretching is increased and the roll-drag marks are easily recognized with the naked eye, which is undesirable, and in contrast, if the stretch ratio is controlled to be higher than 1.5, the strength reduces because the longitudinal stretching is made less, and there is a risk of being torn easily in the oven during the transverse stretching.

In other words, by optimally designing the stretch ratios in the longitudinal and transverse directions as described above, it is possible to secure basic strength and elongation, to suppress the roll-drag marks in the longitudinal direction that are visually recognized with the naked eye, and to optimize the temperature in the oven, thereby providing the convenience of work during application to vehicles and buildings.

More preferably, setting the relative stretch ratio to 1.1 to 1.3 can maintain mass-production stability.

In addition, it is preferable to use calcium carbonate as inert particles capable of improving the roughness and running property of the film surface in the particle layers B and D in accordance with the present invention. This is because, in general, the refractive index of an organic polymer is 1.57 and the refractive index of silica particles is 1.40, whereas the refractive index of calcium carbonate is 1.59, which is the closest to that of the polyester film of 1.64, and accordingly, the probability that inert amorphous particles are visually recognized is lowest in terms of refractive index when visually checking films. In other words, it is possible to lower the visibility degree of the inert particles that are visible in transmitted light or reflected light such as sunlight, fluorescent lamps, and three-wavelengths, thereby making less visible.

In addition, the average particle size of calcium carbonate is preferably 0.01 to 1.5 μm. This is because, if calcium carbonate has a small particle size with the average particle size smaller than 0.01 μm, there is a problem that surface scratches (drag marks) could occur due to the deterioration of running property during processing of the film, and in the case of a large particle size greater than 1.5 μm, the winding stability is increased, but the agglomeration and visibility of the particles are increased inside the film, which cannot resolve the issue of image blurring, which is the ultimate goal of the present invention, and the haze of the film becomes high, which leads to lower usability as a window film and difficulty in securing competitiveness.

More preferably, calcium carbonate having an average particle size of 0.5 to 1.5 μm exhibits stability; however, since the smaller the particle size is, the lower the dispersibility is likely, which in turn leads to a possibility that stability may be lower in the mass-production stage, setting the average particle size of calcium carbonate to 0.8 to 1.2 μm is excellent in terms of mass-production stability, thereby enabling to lower the visibility of particles to resolve the issue of image blurring.

In addition, the polyester film for windows in accordance with an embodiment of the present invention may comprise a coating layer A containing an aqueous emulsion of an acrylic acid alkyl ester copolymer on at least one face of the three-layer laminated polyester film. If a solvent-type acrylic acid alkyl ester copolymer is used for such a coating layer, it is very difficult to secure mass-producibility because the solvent is easily stuck to rolls. Moreover, if a copolymer of urethane or silicone type is used instead of using an acrylic acid alkyl ester copolymer, since the effectiveness of a dye adhesive and a hard coating agent is low during the window film processing, and thus the haze becomes higher or the clarity of the film becomes lower, causing the image blurring to be worse, thereby degrading the anti-blocking property to result in a problem of the films being stuck to each other, it is preferred to include an aqueous emulsion of an acrylic acid alkyl ester copolymer.

Furthermore, the thickness of the coating layer in accordance with the present invention is preferably 5 to 20 nm. It is preferable to use the above thickness because, if the thickness of the coating layer is less than 5 nm, the adhesive strength of the film is low and accordingly the adhesion with the hard coating is poor, and if the thickness of the coating layer is over 20 nm, coating irregularities occur, thereby worsening the image blurring that is sought to be solved by the high-transparency window film.

Moreover, the thickness of the polyester film for windows in accordance with the present invention is preferably 12 to 36 μm.

In addition, the polyester film for windows in accordance with the present invention preferably has a transverse heat shrinkage 0 or lower out of the values of heat shrinkage measured by leaving it in a constant temperature bath at 150° C. for 30 minutes.

Therefore, the polyester film for windows in accordance with the present invention described above has effects of exhibiting excellent optical properties, mass-production stability, and improved application workability, of enabling to be manufactured by the inline and sequential biaxial stretching manufacturing method, of enabling to provide products of uniform physical properties in large quantities, and of being well applicable in terms of processability and usability in various use conditions.

Hereinafter, the construction of the present invention and the effects thereof will be described in greater detail through embodiments and comparative examples. However, these embodiments are intended to illustrate the present invention more specifically, and the scope of the present invention is not limited thereto.

EMBODIMENTS

Embodiment 1

A three-layer laminated polyester film was produced by a sequential biaxial stretching method.

A polyester resin layer C that does not contain fine particles and particle layers B and D consisting of a polyester resin containing 50% by weight of an amorphous calcium carbonate compound having an average particle size of 1.0 μm as upper and lower layers of the polyester resin layer C were formed, and a three-layer laminated polyester film having respective thickness ratios of the layer C to the layers B and D of 18 was produced. At this time, the three-layer polyester film was produced with a relative ratio of the transverse stretch ratio to the longitudinal stretch ratio of 1.3.

Specifically, polyethylene terephthalate (raw material A) containing 50% by weight of an amorphous calcium carbonate compound having an average particle size of 1.0 μm and polyethylene terephthalate (raw material B) having an intrinsic viscosity of 0.62 dl/g containing no particles were dried, laminated, extruded through a coextrusion die, and cooled in a casting drum, to produce a sheet. This sheet was stretched by a stretch ratio of 3.0 times in the longitudinal direction in a temperature range of 95° C. to 110° C., and then was stretched by 3.9 times in the transverse direction in a temperature range of 110° C. to 130° C., and was subjected to a heat treatment at a temperature of about 230° C., to thereby obtain a film of an average thickness of 23 μm, where the thickness ratio of each layer (B/C/D) produced was 1:18:1.

Thereafter, a coating layer having a thickness of 5 nm containing an aqueous emulsion of an acrylic acid alkyl ester copolymer was formed on the layer B of the three-layer laminated polyester film, to thereby produce a polyester film for windows.

Embodiment 2

Except that the thickness of the coating layer was 10 nm, a polyester film for windows was prepared in the same manner as in Embodiment 1.

Embodiment 3

Except that the thickness of the coating layer was 20 nm, a polyester film for windows was prepared in the same manner as in Embodiment 1.

Comparative Example 1

Except that the thickness ratios of the layer C to the layers B and D were 3, respectively, a polyester film for windows was prepared in the same manner as in Embodiment 1.

Comparative Example 2

Except that the thickness ratios of the layer C to the layers B and D were 41, respectively, a polyester film for windows was prepared in the same manner as in Embodiment 1.

Comparative Example 3

Except that an amorphous calcium carbonate compound having an average particle size of 0.005 μm was used, a polyester film for windows was prepared in the same manner as in Embodiment 1.

Comparative Example 4

Except that an amorphous calcium carbonate compound having an average particle size of 1.6 μm was used, a polyester film for windows was prepared in the same manner as in Embodiment 1.

Comparative Example 5

Except that the relative ratio of the transverse stretch ratio to the longitudinal stretch ratio of the three-layer laminated polyester film was 1.0, a polyester film for windows was prepared in the same manner as in Embodiment 1.

Comparative Example 6

Except that the relative ratio of the transverse stretch ratio to the longitudinal stretch ratio of the three-layer laminated polyester film was 1.6, a polyester film for windows was prepared in the same manner as in Embodiment 1.

Comparative Example 7

Except that a solvent-type acrylic acid alkyl ester copolymer was used in place of the aqueous emulsion of the acrylic acid alkyl ester copolymer, a polyester film for windows was prepared in the same manner as in Embodiment 1.

Comparative Example 8

Except that an aqueous emulsion of a urethane copolymer was used in place of the aqueous emulsion of the acrylic acid alkyl ester copolymer, a polyester film for windows was prepared in the same manner as in Embodiment 1.

Comparative Example 9

Except that an aqueous emulsion of a silicone copolymer was used in place of the aqueous emulsion of the acrylic acid alkyl ester copolymer, a polyester film for windows was prepared in the same manner as in Embodiment 1.

Comparative Example 10

Except that the thickness of the coating layer was 1 nm, a polyester film for windows was prepared in the same manner as in Embodiment 1.

Comparative Example 11

Except that the thickness of the coating layer was 4 nm, a polyester film for windows was prepared in the same manner as in Embodiment 1.

Comparative Example 12

Except that the thickness of the coating layer was 21 nm, a polyester film for windows was prepared in the same manner as in Embodiment 1.

Comparative Example 13

Except that the thickness of the coating layer was 30 nm, a polyester film for windows was prepared in the same manner as in Embodiment 1.

Comparative Example 14

Except that silica that is an amorphous silicon oxide was used in place of the amorphous calcium carbonate compound, a polyester film for windows was prepared in the same manner as in Embodiment 1.

The polyester films for windows in accordance with Embodiments 1 to 3 and Comparative Examples 1 to 14 were evaluated through the following experimental examples, and the results are shown in Tables 1 to 3 below.

Experimental Examples

1. Mass-Production Stability

The yield (proportion) of acceptable products based on film breakage or roll-drag marks in the film preparation process of the polyester films in accordance with the embodiments and comparative examples was evaluated as follows:

61% or higher: ⊚
56-60%: ○
51-55%: Δ
46-50%: X
45% or lower: XX

2. Application Workability

The time it took in minutes to complete one application task when applying the polyester films in accordance with the embodiments and comparative examples to the rear side of a vehicle (the size of the rear film was about 3.0 m$^2$ in area) with a heat gun was evaluated as follows:

30 minutes or less: ⊚
30 minutes-1 hour: ○
1-2 hours: Δ
Over 2 hours: X
Not feasible: XX Here, the case where one application task took more than two hours includes the case where two or more repeated application tasks were necessary, and the case where a task was not workable includes the case where three or more repeated application tasks were necessary or the task was too difficult to carry out.

3. Image Blurring

After applying the polyester films in accordance with the embodiments and comparative examples to the rear side of the vehicle with the heat gun, under the condition of a temperature of about 30° C. and a relative humidity of about 40-60% RH at around 12 to 15 o'clock in a clear afternoon without a cloud, the distance up to which a vehicle's license plate was readable through the film and window of the vehicle was evaluated as follows:

Distance of 31 m or longer: ⊚
Between 21-30 m: ○
Between 16-20 m: Δ
Between 11-15 m: X
Distance of 10 m or shorter: XX 4. Roll-Drag Marks When the surface of a film having a width of about 1.6 m was observed using a polarion at an interval 3 m, how many scratches of 1 mm or larger were present was determined in an interval of 2 to 3 m of a stretched roll and evaluated as follows:

None: ⊚
2 or less per A4 size: ○
3-5 per A4 size: Δ
6-10 per A4 size: X
11 or more per A4 size: XX 5. Adhesion After applying an evaluation solution (pink lacquer) to a film sample of A4 size with Meyer bar #18, and the film sample was then placed in a hot air dryer set at 90 to 105° C. to dry for 1 minute. Next, 100 forward grids, which intersect perpendicularly in the TD direction and MD direction, were created on the sample taken out of the dryer using a 1 mm cross cutter, a 3M tape was attached and then peeled off, and the number of dried evaluation solutions remaining without being peeled off out of the 100 dried evaluation solutions was counted and evaluated as follows.

None: ⊚
1-5: ○
6-10: Δ
More than 10: X

6. Blocking

After preparing 20 samples of A4 size in a stack, a weight of 500 g was placed on the samples, and the samples were kept in an oven at 50° C. for 24 hours and then taken out.

The blocking was evaluated according to the degree of adhesion of the samples of A4 size with one another.
- None: ⊚
- 1-2 sheets: ○
- 3-5 sheets: Δ
- More than 5 sheets: X

TABLE 1

| Category | Embodiment 1 | Embodiment 2 | Embodiment 3 |
|---|---|---|---|
| Film thickness | 23 μm | 23 μm | 23 μm |
| Layer C thickness/Layer B (D) thickness | 18 | 18 | 18 |
| Coating layer thickness | 5 nm | 10 nm | 20 nm |
| Average particle size | 1.0 μm | 1.0 μm | 1.0 μm |
| Transverse/longitudinal stretch ratio | 1.3 | 1.3 | 1.3 |
| Haze | ○ | ○ | ○ |
| Image blurring | ⊚ | ⊚ | ⊚ |
| Roll-drag marks | ⊚ | ⊚ | ⊚ |
| Mass-production stability | ⊚ | ⊚ | ⊚ |
| Application Workability | ○ | ○ | ○ |
| Adhesion | ○ | ⊚ | ⊚ |
| Blocking | ○ | ⊚ | ○ | blurring, roll-drag marks, and mass-production stability, and are excellent in application workability, and that the adhesion and blocking properties are also excellent. Therefore, the polyester films for windows in accordance with the present invention can block harmful ultraviolet rays from outside or prevent glare from direct sunlight and reduce thermal energy when attached to an exterior wall glass of a building or vehicle, and can also resolve the phenomenon that an image is blurred or unclear and the image is broken when looking at an external shape through the glass. In addition, a clear external shape can be confirmed even through a polyester film because fine roll-drag defects in the longitudinal that could be caused in the manufacturing process of the polyester film are not visible, and the film can be easily shrunk even when applying a window film to the glass of a vehicle or building with the polyester film being laminated with a release film, thereby providing convenience for customers.

In contrast, in the case of Comparative Example 1 in which the thickness ratios of the layer C to the layers B and D were set to 3, not only image blurring was observed but the haze was also very poor; in the case of Comparative Example 2 in which the thickness ratio was set to 41, it can be seen that mass-production stability and application work-

TABLE 2

| Category | Comp. Example 1 | Comp. Example 2 | Comp. Example 3 | Comp. Example 4 | Comp. Example 5 | Comp. Example 6 | Comp. Example 7 |
|---|---|---|---|---|---|---|---|
| Film thickness | 23 μm | 23 μm | 23 μm | 23 μm | 23 μm | 23 μm | 23 μm |
| Layer C thickness/Layer B (D) thickness | 3 | 41 | 18 | 18 | 18 | 18 | 18 |
| Coating layer thickness | 5 nm | 5 nm | 5 nm | 5 nm | 5 nm | 5 nm | 5 nm |
| Average particle size | 1.0 μm | 1.0 μm | 0.005 μm | 1.6 μm | 1.0 μm | 1.0 μm | 1.0 μm |
| Transverse/longitudinal stretch ratio | 1.3 | 1.3 | 1.3 | 1.3 | 1.0 | 1.6 | 1.3 |
| Haze | XX | ⊚ | ○ | ○ | ○ | ○ | ○ |
| Image blurring | X | ⊚ | ⊚ | X | ○ | Δ | ⊚ |
| Roll-drag marks | ⊚ | ○ | X | ⊚ | XX | ⊚ | X |
| Mass-production stability | Δ | X | X | ○ | ○ | XX | XX |
| Application Workability | ○ | Δ | ○ | ○ | X | ○ | ○ |
| Blocking | ○ | ○ | ○ | ○ | ○ | ○ | ○ | ability were disadvantageous; further, in the case of Com-

TABLE 3

| Category | Comp. Example 8 | Comp. Example 9 | Comp. Example 10 | Comp. Example 11 | Comp. Example 12 | Comp. Example 13 | Comp. Example 14 |
|---|---|---|---|---|---|---|---|
| Film thickness | 23 μm | 23 μm | 23 μm | 23 μm | 23 μm | 23 μm | 23 μm |
| Layer C thickness/Layer B (D) thickness | 18 | 18 | 18 | 18 | 18 | 18 | 18 |
| Coating layer thickness | 5 nm | 5 nm | 1 nm | 4 nm | 21 nm | 30 nm | 5 nm |
| Average particle size | 1.0 μm | 1.0 μm | 1.0 μm | 1.0 μm | 1.0 μm | 1.0 μm | 1.0 μm |
| Transverse/longitudinal stretch ratio | 1.3 | 1.3 | 1.3 | 1.3 | 1.3 | 1.3 | 1.3 |
| Haze | Δ | ○ | ○ | ○ | ○ | ○ | ○ |
| Image blurring | Δ | Δ | ⊚ | ⊚ | Δ | X | X |
| Roll-drag marks | ⊚ | ⊚ | ⊚ | ⊚ | ⊚ | ⊚ | ⊚ |
| Mass-production stability | ⊚ | ⊚ | ⊚ | ⊚ | ⊚ | ⊚ | ⊚ |
| Application Workability | ○ | ○ | ○ | ○ | ○ | ○ | ○ |
| Adhesion | ○ | ○ | X | Δ | ⊚ | ⊚ | ○ |
| Blocking | X | ○ | ○ | ○ | ○ | ○ | ○ |

As can be seen from Tables 1 to 3 above, it is confirmed that the polyester films for windows in accordance with the embodiments of the present invention as disclosed in Embodiments 1 to 3 have low haze, greatly improves image parative Example 3 in which the average particle size of the amorphous calcium carbonate compound was 0.005 μm, the particle size of the calcium carbonate compound was too small, causing the surface roughness of the film to be lower, and there was a problem that scratches (roll-drag marks) occurred during film running; in the case of Comparative Example 4 in which the average particle size of calcium carbonate was set to 1.6 μm, it was confirmed that image blurring appeared; and it can be seen that Comparative Examples 5 and 6 in which the longitudinal/transverse stretch ratios were set to 1.0 and 1.6, respectively, were very disadvantageous in terms of roll-drag marks and application workability as well as mass-production stability.

Moreover, in the case of Comparative Example 7 in which a solvent-type acrylic acid alkyl ester copolymer was used in place of the aqueous emulsion of the acrylic acid alkyl ester copolymer, the solvent was stuck to the process rolls to cause contamination, and accordingly, scratches occurred, resulting in the deterioration of mass-production stability; in the case of Comparative Example 8 in which an aqueous emulsion of a urethane copolymer was used, it was found that the haze was increased, causing the image blurring to worsen, and the blocking evaluation was poor; and Comparative Example 9, in which an aqueous emulsion of a silicone copolymer was used, has a problem that the film has low clarity, causing the image blurring to worsen.

Furthermore, for Comparative Examples 10 and 11 in which the thickness of the coating layer was 1 nm and 4 nm, respectively, the thickness of the coating layer was less than 5 nm and accordingly, the adhesive strength was low, casing a problem of insufficient adhesion with the hard coating. In addition, for Comparative Examples 12 and 13 in which the thickness of the coating layer was 21 nm and 30 nm, respectively, the thickness of the coating layer exceeded 20 nm, causing problems of coating irregularities and the deterioration of image blurring.

Lastly, for Comparative Example 14 in which silica that is an amorphous silicon oxide was used in place of the amorphous calcium carbonate compound, the silica particles have a refractive index of 1.40, which is quite different from the refractive index of the film of 1.57, resulting in the graininess of particles and thereby causing the image blurring to worsen.

Although the present specification has described only a few examples out of various embodiments performed by the present inventors, the spirit of the present invention is not limited or confined thereto, and can also be variously implemented by those having ordinary skill in the art.

What is claimed is:

1. A polyester film for windows comprising:
   a three-layer laminated polyester film produced by a sequential biaxial stretching method; and
   a coating layer A containing an aqueous emulsion of an acrylic acid alkyl ester copolymer on at least one face of the three-layer laminated polyester film,
   wherein the three-layer laminated polyester film consists of a polyester resin layer C that does not contain fine particles, and particle layers B and D of a polyester resin containing an amorphous calcium carbonate compound as upper and lower layers of the polyester resin layer C,
   wherein a thickness ratio of the layer C to the layers B and D is 4 to 40, and
   the three-layer laminated polyester film has a stretch ratio satisfying the following equation (1):

$$1.1 \leq Y/X \leq 1.5 \quad \text{(equation 1)}$$

where X is a longitudinal stretch ratio, and Y is a transverse stretch ratio.

2. The polyester film for windows of claim 1, wherein the thickness ratio of the layer C to the layers B and D is 10 to 20.

3. The polyester film for windows of claim 1, wherein the stretch ratio of the three-layer laminated polyester film is 1.1 to 1.3.

4. The polyester film for windows of claim 1, wherein the amorphous calcium carbonate compound has an average particle size of 0.01 to 1.5 μm.

5. The polyester film for windows of claim 4, wherein the average particle size of the amorphous calcium carbonate compound is 0.8 to 1.2 μm.

6. The polyester film for windows of claim 1, wherein the coating layer has a thickness of 5 to 20 nm.

7. The polyester film for windows of claim 1, wherein the polyester film for windows has a thickness of 12 to 36 μm.

8. The polyester film for windows of claim 1, wherein the polyester film for windows has a transverse heat shrinkage of 0 or lower out of the values of heat shrinkage measured by leaving the polyester film for windows in a constant temperature bath at 150° C. for 30 minutes.

9. The polyester film for windows of claim 2, wherein the polyester film for windows has a transverse heat shrinkage of 0 or lower out of the values of heat shrinkage measured by leaving the polyester film for windows in a constant temperature bath at 150° C. for 30 minutes.

10. The polyester film for windows of claim 3, wherein the polyester film for windows has a transverse heat shrinkage of 0 or lower out of the values of heat shrinkage measured by leaving the polyester film for windows in a constant temperature bath at 150° C. for 30 minutes.

11. The polyester film for windows of claim 4, wherein the polyester film for windows has a transverse heat shrinkage of 0 or lower out of the values of heat shrinkage measured by leaving the polyester film for windows in a constant temperature bath at 150° C. for 30 minutes.

12. The polyester film for windows of claim 5, wherein the polyester film for windows has a transverse heat shrinkage of 0 or lower out of the values of heat shrinkage measured by leaving the polyester film for windows in a constant temperature bath at 150° C. for 30 minutes.

13. The polyester film for windows of claim 6, wherein the polyester film for windows has a transverse heat shrinkage of 0 or lower out of the values of heat shrinkage measured by leaving the polyester film for windows in a constant temperature bath at 150° C. for 30 minutes.

* * * * *